United States Patent
Syouda

(10) Patent No.: US 10,427,547 B2
(45) Date of Patent: Oct. 1, 2019

(54) QUICK CHARGING DEVICE

(71) Applicant: Yazaki Corporation, Tokyo (JP)

(72) Inventor: Takahiro Syouda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/679,360

(22) Filed: Aug. 17, 2017

(65) Prior Publication Data

US 2018/0056798 A1    Mar. 1, 2018

(30) Foreign Application Priority Data

Aug. 25, 2016   (JP) ................. 2016-164949

(51) Int. Cl.
| | |
|---|---|
| H02J 7/00 | (2006.01) |
| H02J 7/14 | (2006.01) |
| B60L 53/30 | (2019.01) |
| B60L 53/14 | (2019.01) |
| B60L 53/60 | (2019.01) |
| B60L 53/10 | (2019.01) |
| B60L 58/19 | (2019.01) |
| B60L 58/12 | (2019.01) |

(52) U.S. Cl.
CPC ............. *B60L 53/30* (2019.02); *B60L 53/11* (2019.02); *B60L 53/14* (2019.02); *B60L 53/60* (2019.02); *B60L 58/12* (2019.02); *B60L 58/19* (2019.02); *H02J 7/0019* (2013.01); *H02J 7/0024* (2013.01); *H02J 7/0027* (2013.01); *B60L 2210/40* (2013.01); *B60L 2240/54* (2013.01); *Y02T 10/7055* (2013.01)

(58) Field of Classification Search
USPC ........ 320/117, 119, 118, 107, 108, 109, 116, 320/121, 126, 127, 134, 162
See application file for complete search history.

(56) References Cited

U.S. PATENT DOCUMENTS

| | | | |
|---|---|---|---|
| 8,026,637 B2 * | 9/2011 | Seligman | A61N 1/378 307/48 |
| 2003/0071466 A1 * | 4/2003 | Gale | B60L 58/19 290/40 C |
| 2003/0122512 A1 * | 7/2003 | Auerbach | B60L 7/16 318/139 |
| 2007/0273209 A1 * | 11/2007 | Endou | B60L 11/005 307/45 |
| 2009/0079384 A1 * | 3/2009 | Harris | B60L 7/14 320/102 |

(Continued)

FOREIGN PATENT DOCUMENTS

JP     2014-193033 A     10/2014

*Primary Examiner* — Alexis B Pacheco
(74) *Attorney, Agent, or Firm* — Kenealy Vaidya LLP

(57) ABSTRACT

During charging, a quick charging device forms a battery module series circuit by connecting a third contact of a first switch to a second contact of the first switch, and connecting a fifth contact of a second switch to a twelfth contact of the second switch, so as to enable a charger to be connected to the battery module series circuit. During discharging, the quick charging device forms a battery module parallel circuit by connecting the third contact of the first switch to a first contact of the first switch, and connecting the fifth contact of the second switch to a fourth contact of the second switch, so as to enable a load unit to be connected to the battery module parallel circuit.

5 Claims, 7 Drawing Sheets

(56) References Cited

U.S. PATENT DOCUMENTS

| | | | | |
|---|---|---|---|---|
| 2009/0085515 A1* | 4/2009 | Bourilkov | ............ | H02J 7/0024 320/117 |
| 2011/0001456 A1* | 1/2011 | Wang | ................... | H02J 7/0016 320/117 |
| 2012/0019209 A1* | 1/2012 | Fink | ................... | H01M 10/425 320/116 |
| 2012/0056478 A1* | 3/2012 | Omoto | ................. | B60L 3/0046 307/11 |
| 2012/0313560 A1* | 12/2012 | Hambitzer | ........ | H01M 10/4207 318/139 |
| 2012/0313584 A1* | 12/2012 | Sugiyama | ............. | B60L 11/123 320/119 |
| 2012/0326654 A1* | 12/2012 | Ito | ...................... | B60L 11/1816 320/103 |
| 2014/0152262 A1* | 6/2014 | Nomoto | ............. | H01M 10/441 320/126 |
| 2014/0354232 A1* | 12/2014 | Carcouet | .............. | H01M 2/202 320/118 |
| 2015/0263390 A1* | 9/2015 | Gagneur | ............... | H02J 7/0016 429/50 |
| 2016/0172717 A1* | 6/2016 | Nakatsuka | ............. | B60L 58/18 320/112 |
| 2017/0237269 A1* | 8/2017 | Chang | ................... | H02J 7/0021 320/118 |
| 2017/0368958 A1* | 12/2017 | Eun | ........................... | B60L 7/10 |

* cited by examiner

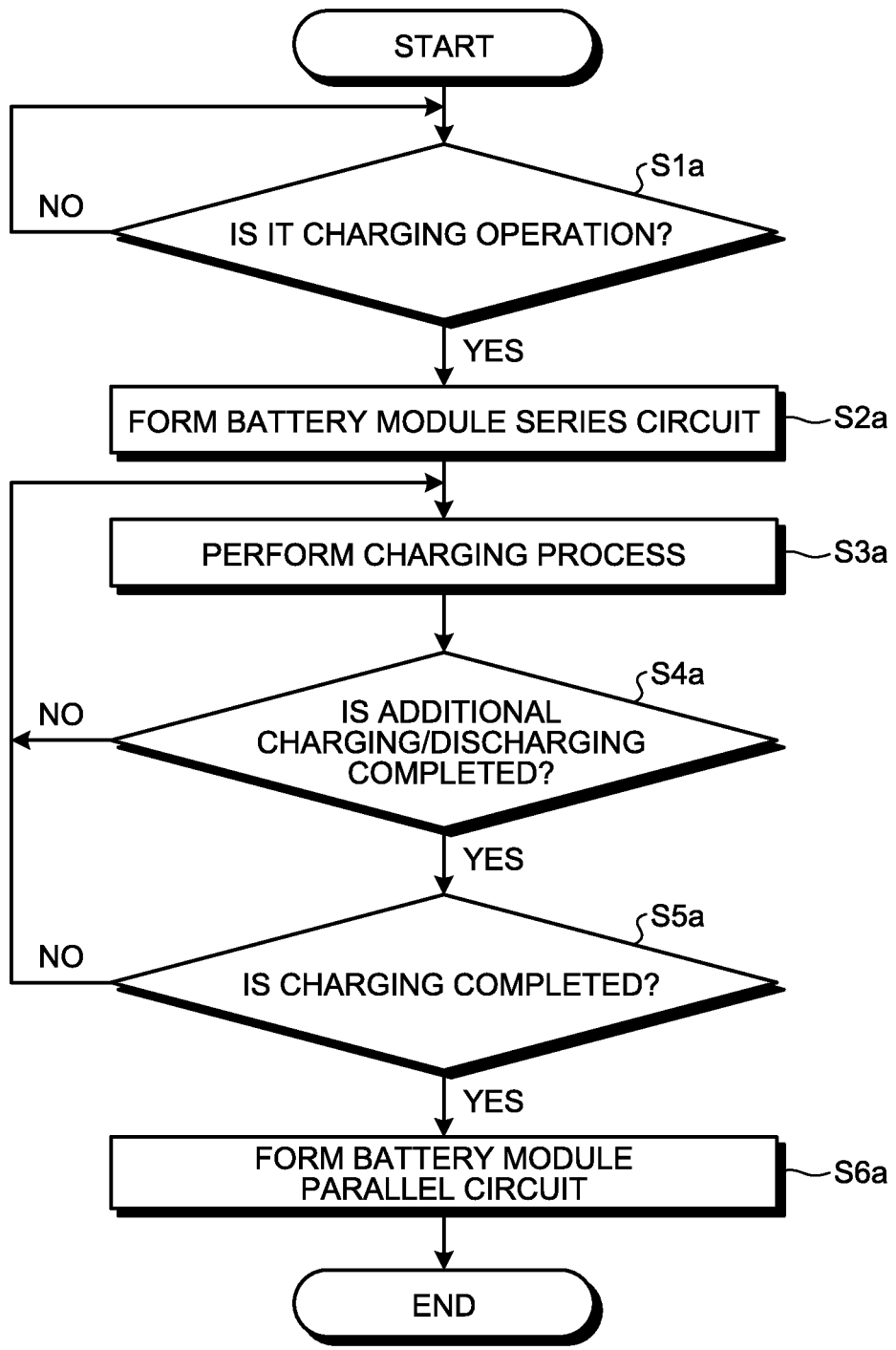

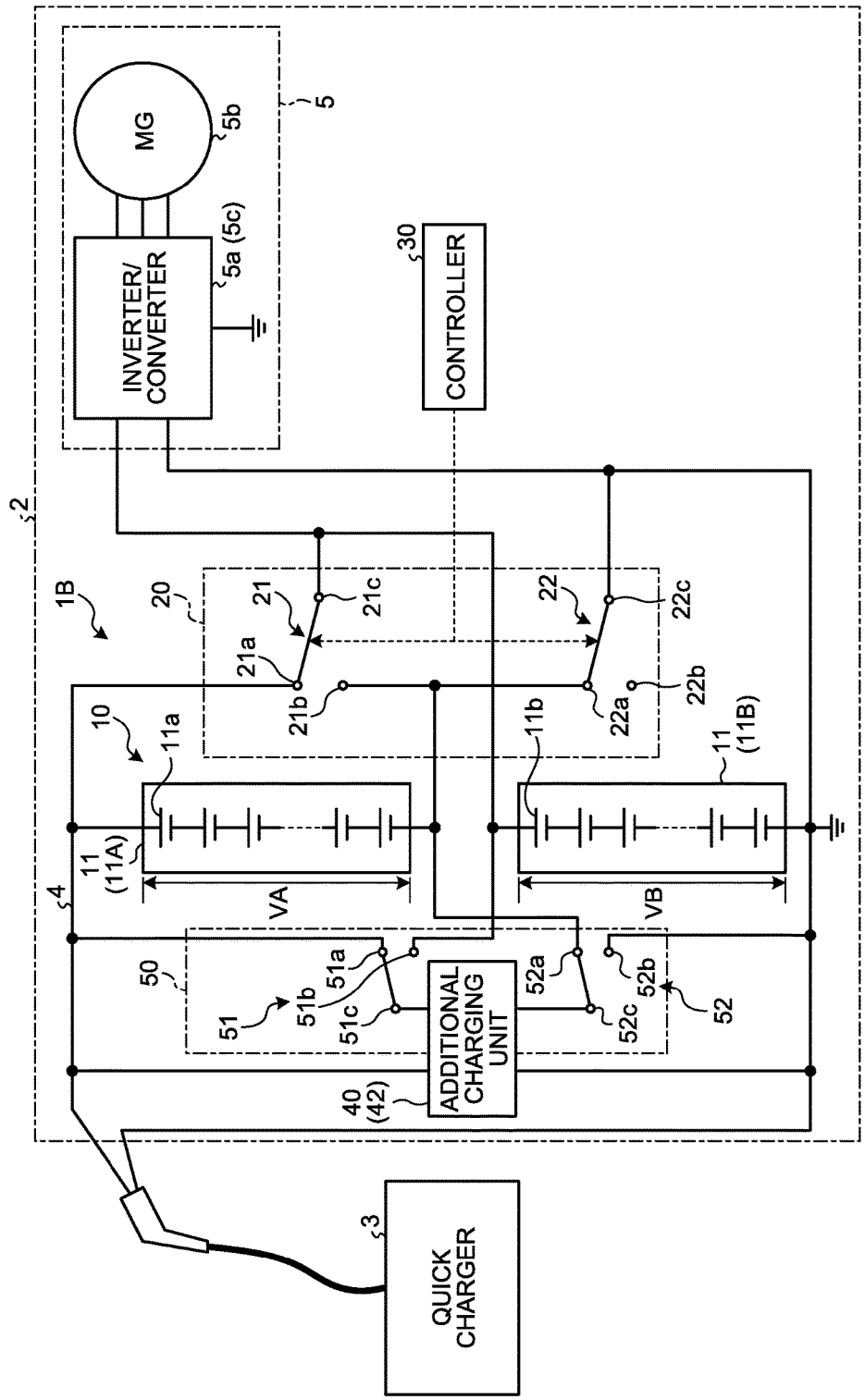

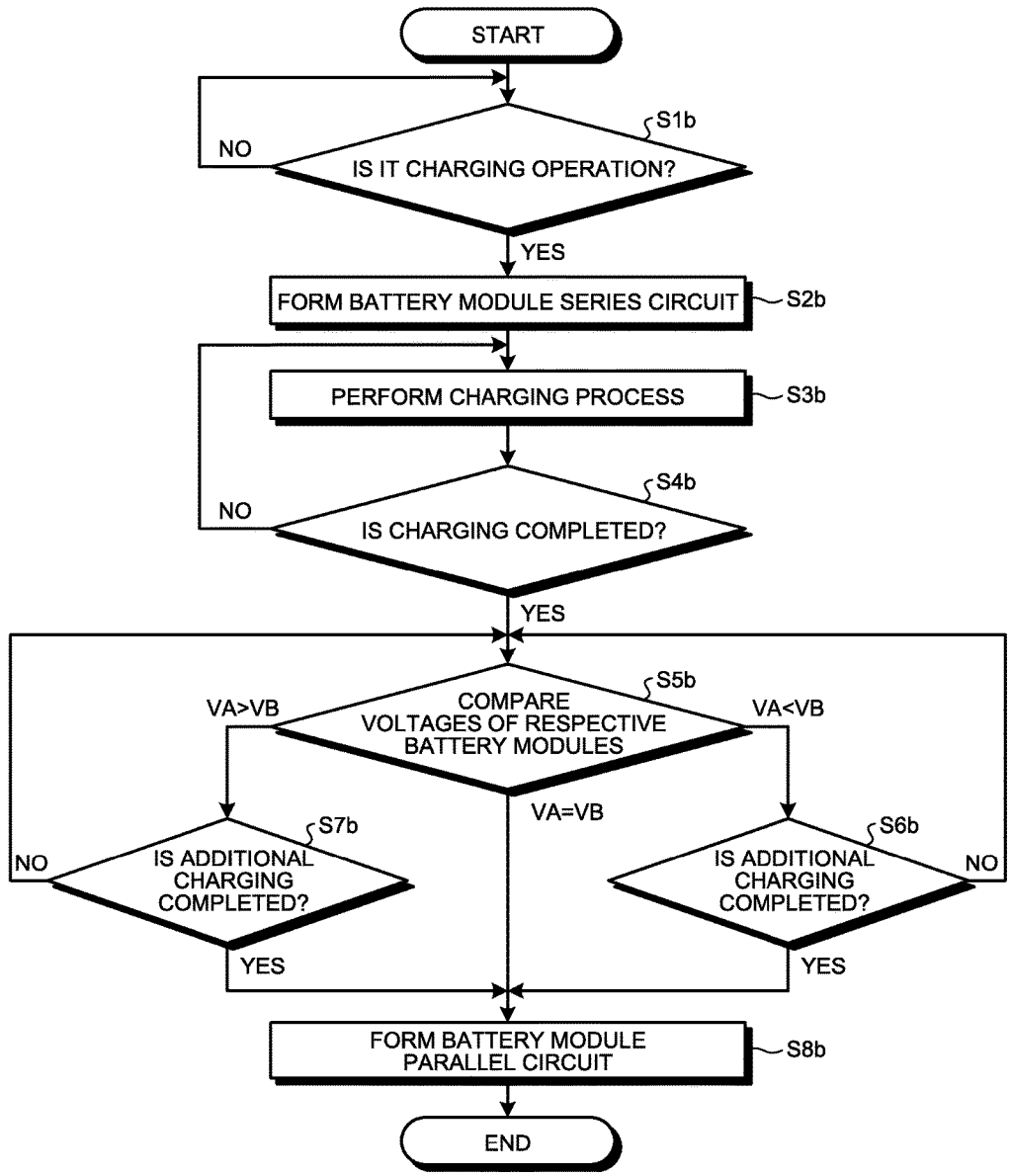

QUICK CHARGING DEVICE

CROSS-REFERENCE TO RELATED APPLICATION(S)

The present application claims priority to and incorporates by reference the entire contents of Japanese Patent Application No. 2016-164949 filed in Japan on Aug. 25, 2016.

BACKGROUND OF THE INVENTION

1. Field of the Invention

The present invention relates to a quick charging device.

2. Description of the Related Art

Having been conventionally available is a quick charging device for quickly charging a storage battery used onboard a vehicle, such as an electric vehicle (EV). Some quick charging devices charge storage batteries with a relatively high voltage, for example, to improve the charging speed. In such a case, the quick charging device uses a storage battery including a plurality of battery modules, and connects the battery modules in series to charge the storage battery, and connects the battery modules in parallel to discharge the storage battery, for example (see Japanese Patent Application Laid-open No. 2014-193033, for example).

Such a quick charging device connects the battery modules in series or in parallel depending on whether the storage battery is to be charged or discharged, but there is still some room for improvement in suppressing a loss in power consumption in such operations.

SUMMARY OF THE INVENTION

To address this issue, an object of the present invention is to provide a quick charging device capable of suppressing a loss in power consumption.

A quick charging device according to one aspect of the present invention includes a first battery module and a second battery module that store therein power; a first switch that has a first contact that is connected to a positive electrode of the first battery module, a second contact that is connected to a negative electrode of the first battery module, and a third contact that is connected to a positive electrode of the second battery module, and that switches to connect the third contact to the first contact or the second contact; a second switch that has a fourth contact that is connected to the negative electrode of the first battery module, and a fifth contact that is connected to a negative electrode of the second battery module, and switches between a connected state in which the fifth contact is connected to the fourth contact and a disconnected state; and a controller that controls connections of the first switch and the second switch, wherein the controller forms, in a charging operation, a battery module series circuit in which the negative electrode of the first battery module and the positive electrode of the second battery module are connected in series by connecting the third contact of the first switch to the second contact of the first switch and by switching the second switch to the disconnected state, so as to enable a charger for charging the first battery module and the second battery module to be connected to the battery module series circuit, and the controller forms, in a discharging operation, a battery module parallel circuit in which the positive electrode of the first battery module is connected to the positive electrode of the second battery module and the negative electrode of the first battery module is connected to the negative electrode of the second battery module by connecting the third contact of the first switch to the first contact of the first switch and by connecting the fifth contact of the second switch to the fourth contact of the second switch, so as to enable a load unit to be connected to the battery module parallel circuit.

According to another aspect of the present invention, the quick charging device may further includes a voltage adjusting unit that adjusts, when there is a potential difference between the first battery module and the second battery module, the potential difference to a value equal to or lower than a preset reference value.

According to still another aspect of the present invention, in the quick charging device, it is preferable that the voltage adjusting unit includes an additional charging/discharging unit that adjusts the potential difference to a value equal to or lower than the reference value by additionally charging or discharging one of the first battery module and the second battery module.

According to still another aspect of the present invention, in the quick charging device, it is preferable that the voltage adjusting unit includes an additional charging unit that adjusts the potential difference to a value equal to or lower than the reference value by additionally charging one of the first battery module and the second battery module whichever having a lower voltage, and a switching unit including a first switch that has a sixth contact that is connected to the positive electrode of the first battery module, a seventh contact that is connected to the positive electrode of the second battery module, and an eighth contact that is connected to one side of the additional charging unit, and that switches to connect the eighth contact to the sixth contact or the seventh contact, and a second switch that has a ninth contact that is connected to the negative electrode of the first battery module, a tenth contact that is connected to the negative electrode of the second battery module, and an eleventh contact that is connected to the other side of the additional charging unit, and switches to connect the eleventh contact to the ninth contact or the tenth contact.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a flowchart illustrating an exemplary operation of the quick charging device according to the second embodiment;

FIG. 6 is a circuit diagram illustrating an exemplary configuration of the quick charging device according to a third embodiment of the present invention; and FIG. 7 is a flowchart illustrating an exemplary operation of the quick charging device according to the third embodiment.

DETAILED DESCRIPTION OF THE PREFERRED EMBODIMENTS

Some embodiment for implementing the present invention will now be explained in detail with reference to some drawings. The descriptions in the following embodiments are not intended to limit the scope of the present invention in any way. Some of the elements described below include those that can be easily thought of by those skilled in the art, and those substantially the same. Furthermore, the configurations described below may be combined as appropriate. Furthermore, various types of omissions, replacement, or modifications are still possible within the scope not deviating from the spirit of the present invention.

First Embodiment

A quick charging device 1 according to a first embodiment of the present invention will now be explained. The quick charging device 1 is for quickly charging a storage battery 10. Explained in this embodiment is an example in which the quick charging device 1 charges a storage battery 10 provided onboard a vehicle 2 such as an electric vehicle (EV), a plug-in hybrid electric vehicle (PHEV), or a hybrid electric vehicle (HEV). The quick charging device 1 will now be explained in detail.

Figure 1:
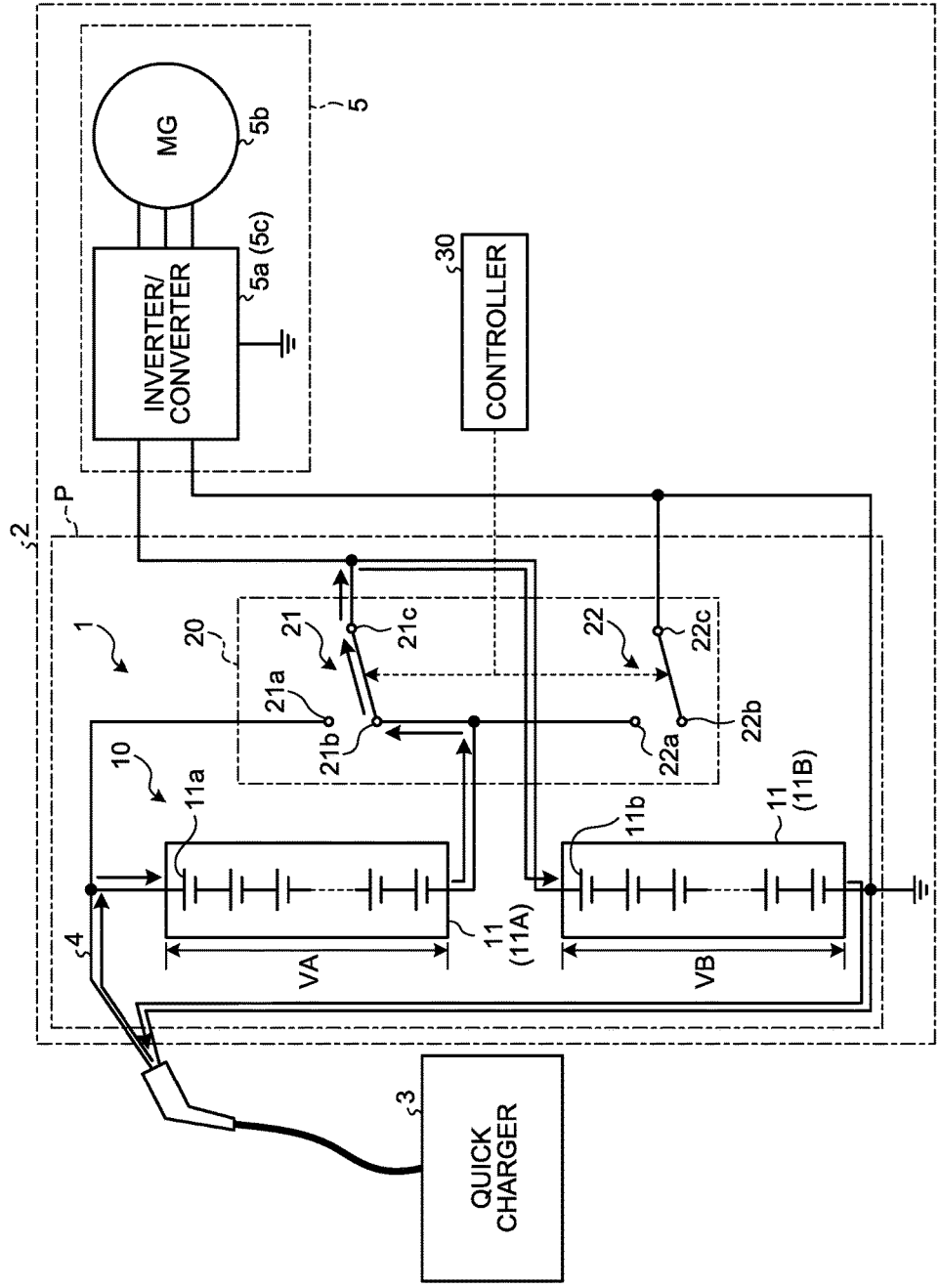
FIG. 1 is a circuit diagram illustrating an exemplary configuration of a series connection in a quick charging device according to a first embodiment of the present invention.

The quick charging device 1 charges the power of the storage battery 10 onboard the vehicle 2, for example. The quick charging device 1 includes, as illustrated in FIG. 1, the storage battery 10, a switching unit 20, and a controller 30. The quick charging device 1 is connected to an external charger (quick charger) 3 over a wire harness 4, for example, and charges the storage battery 10 by receiving a power supply from the charger 3. The external charger 3 is installed in a quick charging station or the like not illustrated, for example. The quick charging device 1 supplies the power charged in the storage battery 10 to an inverter 5a and a motor generator (MG) 5b that are load units 5. For example, the quick charging device 1 has the storage battery 10 connected to the motor generator 5b via the inverter 5a, and the inverter 5a converts the direct current from the storage battery 10 into an alternating current, and the alternating current is supplied to the motor generator 5b.

The storage battery 10 is a battery in which the power is stored. The storage battery 10 supplies the stored power to the load unit 5. The storage battery 10 is a lithium-ion battery, for example, and includes a plurality of battery modules 11. In this example, the storage battery 10 includes two battery modules 11. Each of the battery modules 11 is referred to as a first battery module 11A or a second battery module 11B. To enable the storage battery 10 to be charged quickly, the two battery modules 11 are connected in different configurations depending on whether the storage battery 10 is to be charged or discharged. For example, to charge the storage battery 10, the first battery module 11A and the second battery module 11B are connected in series, and to discharge the storage battery 10, the first battery module 11A and the second battery module 11B are connected in parallel. In this manner, the storage battery 10 can be charged with a voltage about twice the voltage at which the storage battery 10 is discharged, and therefore, the storage battery 10 can be quickly charged. During charging, the positive electrode of the storage battery 10 is connected to the negative electrode of the charger 3, and the negative electrode is connected to the positive electrode of the charger 3. During discharging, the positive electrode of the storage battery 10 is connected to the negative electrode of the load unit 5, and the negative electrode is connected to the positive electrode of the load unit 5. Each of the battery modules 11 provided to the storage battery 10 includes a plurality of battery cells 11a, 11b. In this example, each of the battery cells 11a, 11b has the same voltage. Each of the battery modules 11 includes the same number of battery cells 11a, 11b. In each of the battery modules 11, several tens to several hundreds of battery cells 11a, 11b are connected in series, for example. The voltage VA of the first battery module 11A having all of the battery cells 11a fully charged is equivalent to the voltage VB of the second battery module 11B having all of the battery cells 11b fully charged.

The switching unit 20 is a switch for switching the current path through which the current flows. The switching unit 20 switches the current path based on a switching signal issued by the controller 30 which will be described later. The switching unit 20 connects the first battery module 11A and the second battery module 11B in series, and forms the path for the current flowing from the charger 3 into the first battery module 11A and the second battery module 11B. The switching unit 20 also connects the first battery module 11A and the second battery module 11B in parallel, and forms a path for the current flowing from the first battery module 11A and the second battery module 11B into the load unit 5. The switching unit 20 includes a first switch 21 and a second switch 22. The first switch 21 has a first contact 21a that is connected to the positive electrode of the first battery module 11A, a second contact 21b that is connected to the negative electrode of the first battery module 11A, and a third contact 21c that is connected to the positive electrode of the second battery module 11B, and switches to connect the third contact 21c to the first contact 21a or the second contact 21b. The second switch 22 has a fourth contact 22a that is connected to the negative electrode of the first battery module 11A, a fifth contact 22c that is connected to the negative electrode of the second battery module 11B, and a twelfth contact 22b that breaks the electrical connection, and switches between a connected state in which the fifth contact 22c is connected to the fourth contact 22a, and a disconnected state in which the fifth contact 22c is connected to the twelfth contact 22b.

The controller 30 is connected to the switching unit 20, and controls the switching unit 20. The controller 30 includes an electronic circuit mainly having a known microcomputer including a central processing unit (CPU), a read-only memory (ROM) and a random access memory (RAM) providing a storage unit, and an interface. The controller 30 outputs a switching signal to the switching unit 20, and forms the battery module series circuit P when the storage battery 10 is to be charged, and forms the battery module parallel circuit Q when the storage battery 10 is to be discharged.

When the switching signal indicates to charge, the switching unit 20 connects the third contact 21c on the positive electrode side of the second battery module 11B to the second contact 21b on the negative electrode side of the first battery module 11A, and connects the fifth contact 22c on the negative electrode side of the second battery module 11B to the twelfth contact 22b. The switching unit 20 thus forms the battery module series circuit P in which the negative electrode of the first battery module 11A and the positive electrode of the second battery module 11B are connected in series by the first switch 21 so as to enable the charger 3 to be connected to the battery module series circuit P. In other words, the switching unit 20 connects the negative electrode of the charger 3 to the positive electrode of the battery module series circuit P and connects the positive electrode of the charger 3 to the negative electrode of the battery module series circuit P. In this manner, the quick charging device 1 can charge the storage battery 10 at a voltage higher than a voltage about twice, for example, that used in discharging the storage battery 10.

Figure 2:
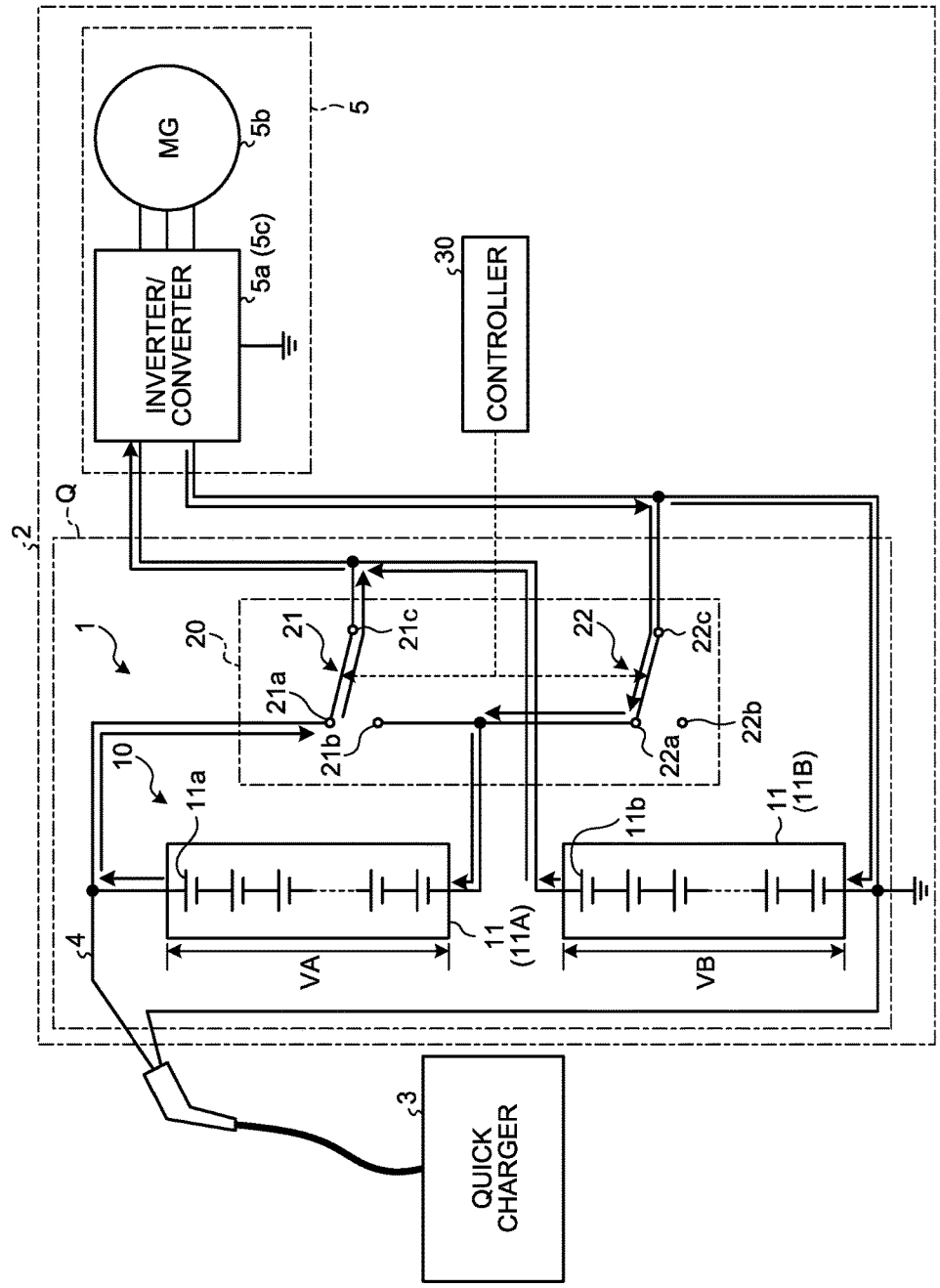
FIG. 2 is a circuit diagram illustrating an exemplary configuration of a parallel connection in the quick charging device according to the first embodiment.

When the switching signal indicates to discharge, the switching unit 20 connects, as illustrated in FIG. 2, the first contact 21a on the positive electrode side of the first battery module 11A to the third contact 21c on the positive electrode side of the second battery module 11B, and connects the fifth contact 22c on the negative electrode side of the second battery module 11B to the fourth contact 22a on the negative electrode side of the first battery module 11A. The switching unit 20 thus forms the battery module parallel circuit Q in which the positive electrode of the first battery module 11A and the positive electrode of the second battery module 11B are connected by the first switch 21, and the negative electrode of the first battery module 11A and the negative electrode of the second battery module 11B are connected by the second switch 22, so as to enable the load unit 5 to be connected to the battery module parallel circuit Q. In other words, the switching unit 20 connects the negative electrode of the load unit 5 to the positive electrode of the battery module parallel circuit Q, and connects the positive electrode of the load unit 5 to the negative electrode of the battery module parallel circuit Q. In this manner, the quick charging device 1 can discharge the storage battery 10 with a voltage lower than a half or so, for example, that used in charging the storage battery 10.

Figure 3:
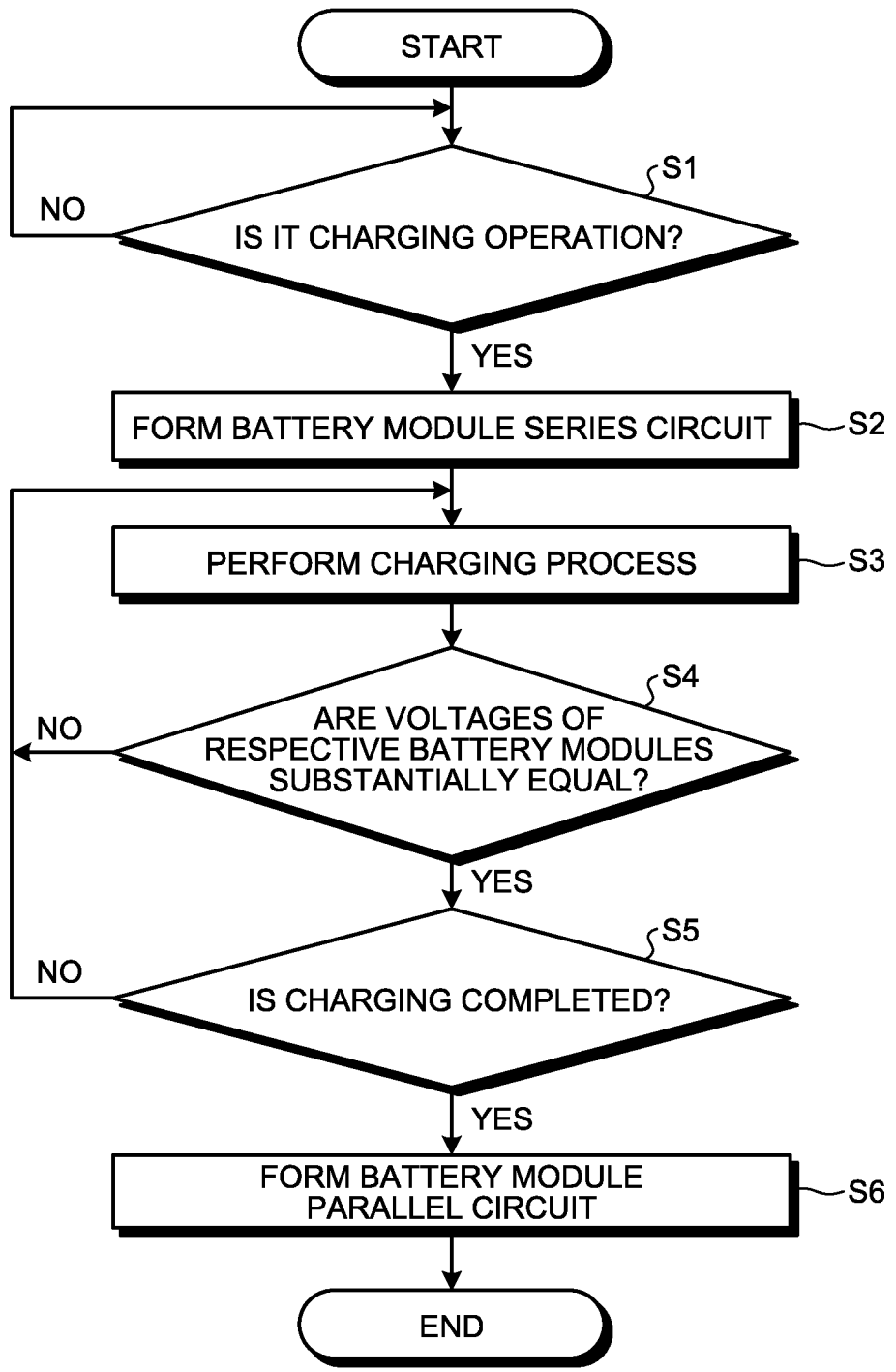
FIG. 3 is a flowchart illustrating an exemplary operation of the quick charging device according to the first embodiment.

An exemplary operation of the quick charging device 1 will now be explained with reference to FIG. 3. The quick charging device 1 determines whether charging has started (Step S1). For example, the quick charging device 1 determines that charging has started if the charger 3 has been connected, and a signal for starting quick charging has been output from the charger 3. If the quick charging device 1 determines that charging has started (Yes at Step S1), the quick charging device 1 switches the switching unit 20 to form the battery module series circuit P (Step S2). The quick charging device 1 then causes the charger 3 to apply current to the battery module series circuit P, and charges each of the battery modules 11 that are connected in series (Step S3). At this time, the quick charging device 1 monitors the voltage of each of the battery cells 11a, 11b included in the first battery module 11A and the second battery module 11B using a cell voltage sensor (CVS), and equalizes the voltages of the respective battery cells 11a, 11b by causing a battery cell 11a, 11b having reached a voltage higher than that of the other battery cells 11a, 11b to discharge into a resistance or to transfer the power to the other battery cells 11a, 11b. In this manner, the quick charging device 1 can equalize the potential difference between the first battery module 11A and the second battery module 11B. This configuration enables the quick charging device 1 to connect the first battery module 11A and the second battery module 11B in parallel during a discharge operation, without using a resistance, for example, in the manner having been conventionally practiced. The charger 3 adjusts its output voltage so as to charge the storage battery 10 at a predetermined C rate (a current with respect to the battery capacity), based on the voltage of the battery module series circuit P.

The quick charging device 1 detects the voltage of the battery modules 11 using a voltage detecting unit not illustrated, and determines whether the voltages of the respective battery modules 11 are substantially equal (Step S4). If the voltages of the respective battery modules 11 are substantially equal (Yes at Step S4), the quick charging device 1 determines whether the charging has been completed (Step S5). For example, the quick charging device 1 determines whether at least one of the battery modules 11 has reached a charging ending voltage. If at least one of the battery modules 11 has reached the charging ending voltage, and the charging has been completed (Yes at Step S5), the quick charging device 1 stops the power supply from the charger 3, forms the battery module parallel circuit Q, and ends the process (Step S6). The charging ending voltage herein is a voltage indicating that the charging has been completed, and is a predetermined voltage for preventing overcharge.

At Step S1 described above, if the quick charging device 1 determines that the charging has not been started yet (No at Step S1), the quick charging device 1 determines whether charging has started, again. At Step S4 described above, if the voltages of the respective battery modules 11 are not substantially equal (No at Step S4), the quick charging device 1 shifts the process back to Step S3, and charges the battery modules 11 while equalizing the voltages of the respective battery cells 11a, 11b. At Step S5 described above, if none of the battery modules 11 has reached the charging ending voltage, and the charging has not been completed yet (No at Step S5), the quick charging device 1 shifts the process back to Step S3, and charges the battery modules 11 while equalizing the voltages of the respective battery cells 11a, 11b.

As described above, to charge the storage battery 10, by connecting the third contact 21c of the first switch 21 to the second contact 21b of the first switch 21, and connecting the fifth contact 22c of the second switch 22 to the twelfth contact 22b of the second switch 22, the quick charging device 1 according to the first embodiment can form the battery module series circuit P in which the negative electrode of the first battery module 11A is connected to the positive electrode of the second battery module 11B in series, so as to enable the charger 3 to be connected to the battery module series circuit P. Furthermore, to discharge the storage battery 10, by connecting the third contact 21c of the first switch 21 to the first contact 21a of the first switch 21, and connecting the fifth contact 22c of the second switch 22 to the fourth contact 22a of the second switch 22, the quick charging device 1 can form the battery module parallel circuit Q in which the positive electrode of the first battery module 11A is connected to the positive electrode of the second battery module 11B and the negative electrode of the first battery module 11A is connected to the negative electrode of the second battery module 11B, so as to enable the load unit 5 to be connected to the battery module parallel circuit Q. In this manner, the quick charging device 1 can form the battery module series circuit P and the battery module parallel circuit Q using the first switch 21 and second switch 22, so that these circuits can be achieved with minimum switches required, and the power loss can be suppressed. Furthermore, because the quick charging device 1 charges the battery modules with a high voltage using the battery module series circuit P, the amount of power can be increased without increasing the current. In this manner, the quick charging device 1 can suppress the power loss resulting from an increased current, and can also suppress heating of the wire harness 4 and the like.

Modification of First Embodiment

The quick charging device 1 may also generate, for regenerative braking, a regenerative voltage using a motor generator 5b, boost the regenerative voltage using a converter 5c, and charge the power to the storage battery 10.

Furthermore, explained above is an example in which the storage battery 10 includes two battery modules 11, but the storage battery may also include more than two battery modules 11. Furthermore, explained above is an example in which the battery cells 11a, 11b included in the storage battery 10 have the same voltage, but may also have different voltage.

Second Embodiment

Figure 4:
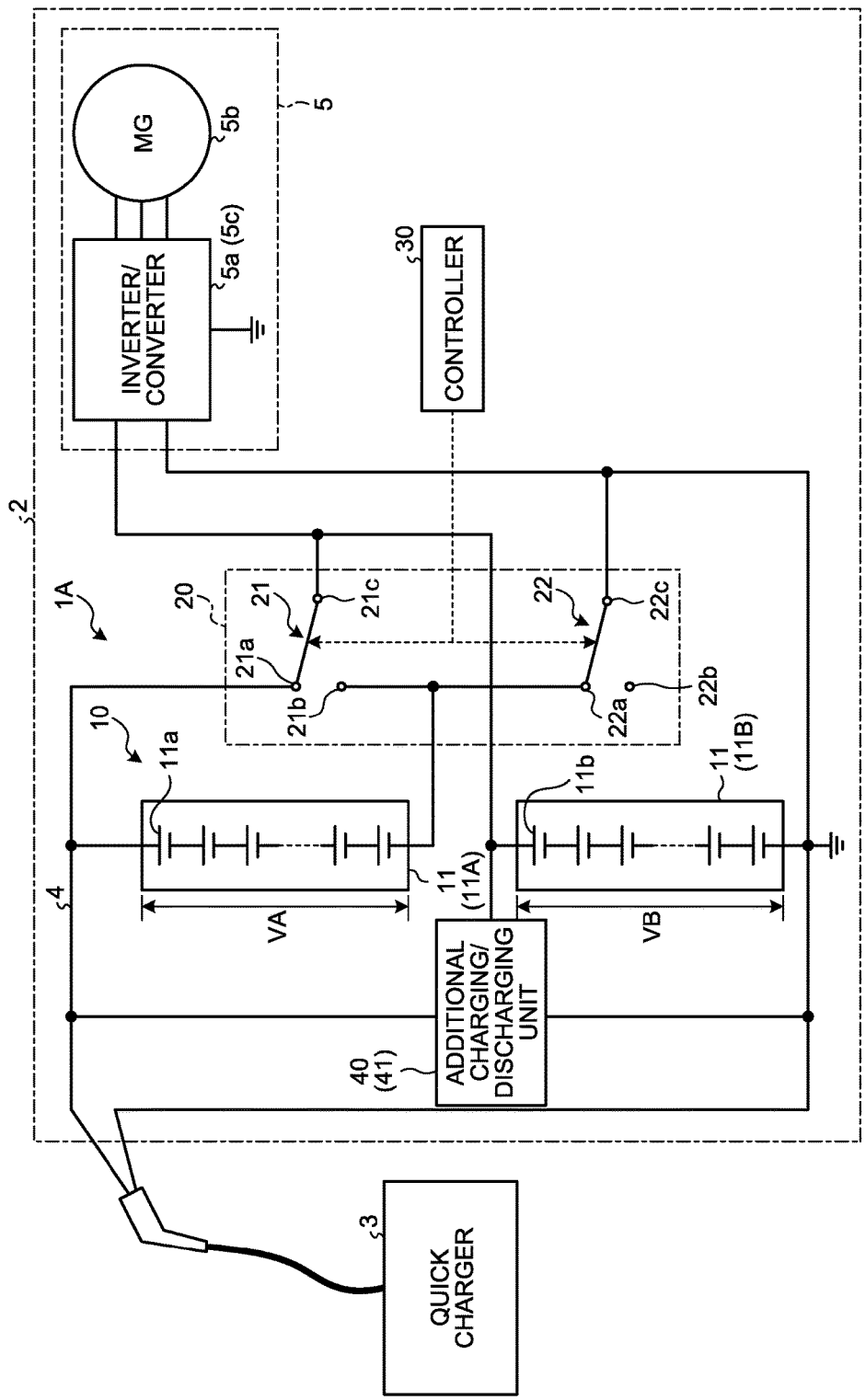
FIG. 4 is a circuit diagram illustrating an exemplary configuration of the quick charging device according to a second embodiment of the present invention.

A quick charging device 11A according to a second embodiment of the present invention will now be explained. The quick charging device 11A according to the second embodiment is different from the quick charging device 1 according to the first embodiment in being provided with a voltage adjusting unit 40 that adjusts the potential difference between the battery modules 11, as illustrated in FIG. 4. In the second embodiment, elements that are the same as those according to the first embodiment will be given the same reference numerals as those in the first embodiment, and detailed explanations thereof will be omitted.

The voltage adjusting unit 40 is for adjusting the potential difference between the first battery module 11A and the second battery module 11B. If there is any potential difference between the first battery module 11A and the second battery module 11B during or after the quick charging, the voltage adjusting unit 40 adjusts the potential difference to a value equal to or lower than the preset reference value. Adjusting the potential difference to a value equal to or lower than the preset reference value means to keep the current flowing through the battery module parallel circuit Q within a range (current upper boundary) not adversely affecting the quick charging device 1A or the load unit 5, for example. The current in the quick charging device 1A is determined by resistance components, such as the battery modules 11, the wire harness 4, and the switching unit 20 included in the battery module parallel circuit Q, and on the potential difference between the battery modules 11. The quick charging device 1A needs to keep the current that is caused to flow by the potential difference between the battery modules 11 to a value equal to or lower than the current upper boundary of the battery module parallel circuit Q.

In the second embodiment, the voltage adjusting unit 40 serves as additional charging/discharging unit 41 performing additional charging or discharging. The additional charging/discharging unit 41 is connected to the positive electrode and the negative electrode of the charger 3, and is connected to the positive electrode and the negative electrode of the second battery module 11B. The additional charging/discharging unit 41 includes, for example, a switch not illustrated for switching ON and OFF the voltage to be additionally applied from the charger 3 to the second battery module 11B, and a load unit not illustrated for discharging the second battery module 11B. The additional charging/discharging unit 41 adjusts the potential difference to a value equal to or lower than the reference value by additionally charging or discharging the second battery module 11B. The additional charging/discharging unit 41 may also be connected to the first battery module 11A, instead of the second battery module 11B, and may adjust the potential difference to a value equal to or lower than the reference value by additionally charging or discharging the first battery module 11A.

An exemplary operation of the quick charging device 1A according to the second embodiment will now be explained with reference to FIG. 5. The quick charging device 1A determines whether charging has started (Step S1a). For example, the quick charging device 1A determines that charging has started if the charger 3 has been connected, and a signal for starting quick charging has been output from the charger 3. If the quick charging device 1A determines that charging has started (Yes at Step S1a), the quick charging device 1A switches the switching unit 20 to form the battery module series circuit P (Step S2a). The quick charging device 1A then causes the charger 3 to apply current to the battery module series circuit P, and charges each of the battery modules 11 that are connected in series (Step S3a). At this time, the quick charging device 1A monitors the voltage of each of the battery cells 11a, 11b using a CVS, equalizes the voltage of the battery cells 11a, 11b by causing a battery cell 11a, 11b having reached a higher voltage than those of the other battery cells 11a, 11b to discharge into a resistance or to transfer the power to the other battery cells 11a, 11b.

The quick charging device 1A then determines whether the additional charging/discharging caused to be performed based on the potential difference between the battery modules 11 has been completed (Step S4a). For example, the quick charging device 1A detects the voltage of each of the battery modules 11 using the voltage detecting unit, and determines whether the voltages of the respective battery modules 11 are substantially equal, that is, whether the potential difference between the battery modules 11 is equal to or lower than the reference value. If the voltages of the respective battery modules 11 are not substantially equal, the quick charging device 1A performs the additional charging or discharging, using the additional charging/discharging unit 41. For example, if the voltage VB of the second battery module 11B is lower than the voltage VA of the first battery module 11A, the quick charging device 1A applies an additional voltage to the second battery module 11B using the additional charging/discharging unit 41 so that the voltage VB of the second battery module 11B is increased. If the voltage VB of the second battery module 11B is higher than the voltage VA of the first battery module 11A, the quick charging device 1A discharges the second battery module 11B using the additional charging/discharging unit 41 so that the voltage VB of the second battery module 11B is decreased. If the voltages of the respective battery modules 11 become substantially equal, and the additional charging/discharging has been completed (Yes at Step S4a), the quick charging device 1A determines whether the charging has been completed (Step S5a). For example, the quick charging device 1A determines whether at least one of the battery modules 11 has reached the charging ending voltage. If at least one of the battery modules 11 has reached the charging ending voltage, and the charging has been completed (Yes at Step S5a), the quick charging device 1A stops the power supply from the charger 3, forms the battery module parallel circuit Q, and ends the process (Step S6a).

At Step S1a described above, if the quick charging device 1A determines that charging has not started yet (No at Step S1a), the quick charging device 1A determines whether charging has started, again. At Step S4a described above, if the voltages of the respective battery modules 11 are not substantially equal and the additional charging/discharging has not been completed (No at Step S4a), the quick charging device 1A shifts the process back to Step S1a, and charges the battery modules 11. At Step S5a described above, if none of the battery modules 11 has reached the charging ending voltage, and the charging has not been completed yet (No at Step S5a), the quick charging device 1A shifts the process back to Step S1a, and charges the battery modules 11.

If the voltage VB of the second battery module 11B is lower than the voltage VA of the first battery module 11A, and the second battery module 11B includes a battery cell 11b that is fully charged, the quick charging device 1A charges the first battery module 11A and the second battery module 11B while discharging the second battery module 11B using the additional charging/discharging unit 41. This is because, although the voltage VB needs to be boosted because the voltage VB is lower than the voltage VA, but the second battery module 11B cannot be charged any further because the second battery module 11B includes the battery cell 11b that is fully charged. Therefore, the first battery module 11A and the second battery module 11B are charged while discharging the second battery module 11B.

As described above, the quick charging device 1A according to the second embodiment includes the voltage adjusting unit 40 that adjusts, when there is any potential difference between the first battery module 11A and the second battery module 11B before the battery module parallel circuit Q is formed, the potential difference to a value equal to or lower than the preset reference value. In this manner, because the quick charging device 1A equalizes the voltage of the battery cells 11a, 11b included in the respective battery modules 11, and adjusts the potential difference in units of the battery module 11, the potential difference between the battery modules 11 can be adjusted to a value equal to or lower than the reference value in a short time period. Furthermore, the quick charging device 1A can reduce a power loss, and adjust the potential difference in a shorter time period, compared with a configuration in which the potential difference between a plurality of battery modules 11 is adjusted using a resistance, as has been conventionally practiced.

Furthermore, the additional charging/discharging unit 41 adjusts the potential difference between the first battery module 11A and the second battery module 11B to a value equal to or lower than the reference value, by additionally charging or discharging one of the first battery module 11A and the second battery module 11B, which is, in this example, the second battery module 11B. In this manner, because the quick charging device 1A additionally charges or discharges one of the first battery module 11A and the second battery module 11B, the circuit configuration or the like can be simplified, compared with a configuration in which both of the first battery module 11A and the second battery module 11B are additionally charged, for example.

Third Embodiment

A quick charging device 1B according to a third embodiment of the present invention will now be explained. The quick charging device 1B according to the third embodiment is different from the quick charging device 1 according to the first embodiment in being provided with the voltage adjusting unit 40 that adjusts the potential difference between the battery modules 11, as illustrated in FIG. 6. In the third embodiment, elements that are the same as those according to the first embodiment will be given the same reference numerals as those in the first embodiment, and detailed explanations thereof will be omitted.

In the third embodiment, the voltage adjusting unit 40 includes an additional charging unit 42 that performs additional charging, and a switching unit 50. The additional charging unit 42 is connected to the positive electrode and the negative electrode of the charger 3. The additional charging unit 42 is connected to the positive electrode and the negative electrode of the first battery module 11A, and is connected to the positive electrode and the negative electrode of the second battery module 11B. The additional charging unit 42 includes, for example, a switch not illustrated for turning ON and OFF the voltage to be additionally applied to each of the battery modules 11 by the charger 3. The additional charging unit 42 adjusts the potential difference to a value equal to or lower than the reference value by additionally charging one of the first battery module 11A and the second battery module 11B, whichever having a lower voltage.

The switching unit 50 includes a first switch 51 and a second switch 52. The first switch 51 has a sixth contact 51a that is connected to the positive electrode of the first battery module 11A, a seventh contact 51b that is connected to the positive electrode of the second battery module 11B, and an eighth contact 51c that is connected to one side of the additional charging unit 42, and switches to connect the eighth contact 51c to the sixth contact 51a or the seventh contact 51b. The second switch 52 has a ninth contact 52a that is connected to the negative electrode of the first battery module 11A, a tenth contact 52b that is connected to the negative electrode of the second battery module 11B, and an eleventh contact 52c that is connected to the other side of the additional charging unit 42, and switches to connect the eleventh contact 52c to the ninth contact 52a or the tenth contact 52b.

The switching unit 50 connects the eleventh contact 52c of the additional charging unit 42 to the ninth contact 52a on the negative electrode side of the first battery module 11A, and connects the eighth contact 51c of the additional charging unit 42 to the sixth contact 51a on the positive electrode side of the first battery module 11A, based on the switching signal. In this manner, the switching unit 50 connects the additional charging unit 42 to the first battery module 11A.

The switching unit 50 also connects the eleventh contact 52c of the additional charging unit 42 to the tenth contact 52b on the negative electrode side of the second battery module 11B, and connects the eighth contact 51c of the additional charging unit 42 to the seventh contact 51b on the positive electrode side of the second battery module 11B, based on the switching signal. In this manner, the switching unit 50 connects the additional charging unit 42 to the second battery module 11B.

An exemplary operation of the quick charging device 1B according to the third embodiment will now be explained with reference to FIG. 7. The quick charging device 1B determines whether charging has started (Step S1b). For example, the quick charging device 1B determines that charging has started if the charger 3 has been connected, and a signal for starting quick charging has been output from the charger 3. If the quick charging device 1B determines that charging has started (Yes at Step S1b), the quick charging device 1B switches the switching unit 20 to form the battery module series circuit P (Step S2b). The quick charging device 1B then causes the charger 3 to apply current to the battery module series circuit P, and charges each of the battery modules 11 that are connected in series (Step S3b). At this time, the quick charging device 1B monitors the voltage of each of the battery cells 11a, 11b using a CVS, and equalizes the voltage of the battery cells 11a, 11b by causing a battery cell 11a, 11b having reached a higher voltage than those of the other battery cells 11a, 11b to discharge into a resistance or to transfer the power to the other battery cells 11a, 11b.

The quick charging device 1B then determines whether the charging has been completed (Step S4b). For example, the quick charging device 1B determines whether at least one of the battery modules 11 has reached the charging ending voltage. If at least one of the battery modules 11 has reached the charging ending voltage, and the charging has been completed (Yes at Step S4b), the quick charging device 1B compares the voltages of the respective battery modules 11 (Step S5b). If the voltage VA of the first battery module 11A is lower than the voltage VB of the second battery module 11B (VA<VB), the quick charging device 1B connects the additional charging unit 42 to the first battery module 11A, and additionally charges the first battery module 11A. If the voltages of the respective battery modules 11 become substantially equal, that is, if the potential difference between the battery modules 11 becomes equal to or lower than the reference value, and additional charging has been completed (Yes at Step S6b), the quick charging device 1B stops the power supply from the charger 3, forms the battery module parallel circuit Q, and ends the process (Step S8b). If the voltage VB of the second battery module 11B is lower than the voltage VA of the first battery module 11A (VA>VB), the quick charging device 1B connects the additional charging unit 42 to the second battery module 11B, and additionally charges the second battery module 11B. If the voltages of the respective battery modules 11 become substantially equal, and the additional charging is completed (Yes at Step S7b), the quick charging device 1B stops the power supply from the charger 3, forms the battery module parallel circuit Q, and ends the process (Step S8b). If the voltage VA of the first battery module 11A is substantially the same as the voltage VB of the second battery module 11B (VA=VB), the quick charging device 1B stops the power supply from the charger 3, forms the battery module parallel circuit Q, and ends the process (Step S8b).

At Step S1b described above, if the quick charging device 1B determines that charging has not started yet (No at Step S1b), the quick charging device 1B determines whether charging has started, again. At Step S4b described above, if none of the battery modules 11 has reached the charging ending voltage, and the charging has not been completed yet (No at Step S4b), the quick charging device 1B shifts the process back to Step S1b, and charges the battery modules 11. At Step S6b described above, if the additional charging has not been completed yet (No at Step S6b), the quick charging device 1B shifts the process back to Step S5b, and compares the voltages of the respective battery modules 11. At Step S7b described above, if the additional charging has not been completed yet (No at Step S7b), the quick charging device 1B shifts the process back to Step S5b, and compares the voltages of the respective battery modules 11.

As described above, the quick charging device 1B according to the third embodiment adjusts the potential difference to a value equal to or lower than the reference value by additionally charging one of the first battery module 11A and the second battery module 11B, whichever having a lower voltage. In this manner, because the quick charging device 1B equalizes the voltage of the battery cells 11a, 11b included in the battery modules 11, and adjusts the potential difference in units of the battery module 11, the potential difference between the battery modules 11 can be adjusted to a value equal to or lower than the reference value in a short time period. Furthermore, because the quick charging device 1B does not adjust the potential difference by discharging, as the quick charging device 1A according to the second embodiment, the power loss can be reduced.

Modification of Third Embodiment

Explained above is an example in which the voltage adjusting unit 40 serves as the additional charging unit 42 performing additional charging, but the present invention is not limited thereto. The voltage adjusting unit 40 may also serve as a discharging unit for discharging. In such a configuration, the discharging unit adjusts the potential difference to a value equal to or lower than the reference value by connecting to the first battery module 11A or the second battery module 11B, and discharging the first battery module 11A or the second battery module 11B whichever having a higher voltage.

Furthermore, the quick charging device 1B performs the additional charging after the charging is completed, but the present invention is not limited thereto. The quick charging device 1B may perform the additional charging while the battery modules are being charged. In such a case, the quick charging device 1B can reduce the time required for charging, because the voltage VA of the first battery module 11A will be substantially the same as the voltage VB of the second battery module 11B by the time at which the charging of these battery modules is completed.

The quick charging device 1 may include the battery modules 11 including the battery cells 11a, 11b, a switching unit 20 that switches to form the battery module series circuit P in which the battery modules 11 are connected in series so as to enable the charger 3 is for charging the battery modules 11 to be connected to the battery module series circuit P, and to form the battery module parallel circuit Q in which the battery modules 11 are connected in parallel so as to enable the load unit 5 to be connected to the battery module parallel circuit Q, the controller 30 that controls the switching unit 20 to switch to the battery module series circuit P when the battery modules 11 are to be charged, and to the battery module parallel circuit Q when the battery modules 11 are to be discharged, and the voltage adjusting unit 40 that adjusts, when there is a potential difference between the battery modules 11, the potential difference to a value equal to or lower than the preset reference value before switching to the battery module parallel circuit Q.

During charging, the quick charging device according to the embodiments forms the battery module series circuit in which the negative electrode of the first battery module and the positive electrode of the second battery module are connected in series by connecting the third contact of the first switch to the second contact of the first switch and by disconnecting the second switch, so as to enable the charger for charging the first battery module and the second battery module to be connected to the battery module series circuit. To discharge the storage battery, the quick charging device forms a battery module parallel circuit in which the positive electrode of the first battery module is connected to the positive electrode of the second battery module, and the negative electrode of the first battery module is connected to the negative electrode of the second battery module by connecting the third contact of the first switch to the first contact of the first switch and by connecting the fifth contact of the second switch to the fourth contact of the second switch, so as to enable the load unit to be connected to the battery module parallel circuit. In this manner, the quick charging device can form a battery module series circuit and a battery module parallel circuit using the first switch and the second switch, so that these circuits can be achieved with the minimum switches required, and a loss in power consumption can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A quick charging device comprising:
a first battery module and a second battery module that store therein power, the first battery module includes a plurality of first battery cells, and the second battery module includes a plurality of second battery cells;
a first switch that has a first contact that is connected to a positive electrode of the first battery module, a second contact that is connected to a negative electrode of the first battery module, and a third contact that is connected to a positive electrode of the second battery module, and that switches to connect the third contact to the first contact or the second contact;
a second switch that has a fourth contact that is connected to the negative electrode of the first battery module, and a fifth contact that is connected to a negative electrode of the second battery module, and switches between a connected state in which the fifth contact is connected to the fourth contact and a disconnected state; and
a controller that controls connections of the first switch and the second switch, wherein
the controller forms, in a charging operation, a battery module series circuit in which the negative electrode of the first battery module and the positive electrode of the second battery module are connected in series by connecting the third contact of the first switch to the second contact of the first switch and by switching the second switch to the disconnected state, so as to enable a charger for charging the first battery module and the second battery module to be connected to the battery module series circuit,
the controller forms, in a discharging operation, a battery module parallel circuit in which the positive electrode of the first battery module is connected to the positive electrode of the second battery module and the negative electrode of the first battery module is connected to the negative electrode of the second battery module by connecting the third contact of the first switch to the first contact of the first switch and by connecting the fifth contact of the second switch to the fourth contact of the second switch, so as to enable a load unit to be connected to the battery module parallel circuit, and
the controller, in the charging operation, equalizes a potential difference between the first battery module and the second battery module by causing a first one of the first battery cells or a first one of the second battery cells that has a higher voltage than a remainder of the first battery cells or a remainder of the second battery cells, respectively, to transfer power to the remainder of the first battery cells or to the remainder of the second battery cells, respectively.

2. A quick charging device comprising:
a first battery module and a second battery module that store therein power;
a first switch that has a first contact that is connected to a positive electrode of the first battery module, a second contact that is connected to a negative electrode of the first battery module, and a third contact that is connected to a positive electrode of the second battery module, and that switches to connect the third contact to the first contact or the second contact;
a second switch that has a fourth contact that is connected to the negative electrode of the first battery module, and a fifth contact that is connected to a negative electrode of the second battery module, and switches between a connected state in which the fifth contact is connected to the fourth contact and a disconnected state;
a controller that controls connections of the first switch and the second switch; and
a voltage adjusting unit that adjusts, when there is a potential difference between the first battery module and the second battery module, the potential difference to a value equal to or lower than a preset reference value, wherein
the controller forms, in a charging operation, a battery module series circuit in which the negative electrode of the first battery module and the positive electrode of the second battery module are connected in series by connecting the third contact of the first switch to the second contact of the first switch and by switching the second switch to the disconnected state, so as to enable a charger for charging the first battery module and the second battery module to be connected to the battery module series circuit, and
the controller forms, in a discharging operation, a battery module parallel circuit in which the positive electrode of the first battery module is connected to the positive electrode of the second battery module and the negative electrode of the first battery module is connected to the negative electrode of the second battery module by connecting the third contact of the first switch to the first contact of the first switch and by connecting the fifth contact of the second switch to the fourth contact of the second switch, so as to enable a load unit to be connected to the battery module parallel circuit.

3. The quick charging device according to claim 2, wherein
the voltage adjusting unit includes an additional charging/discharging unit that adjusts the potential difference to a value equal to or lower than the reference value by additionally charging or discharging one of the first battery module and the second battery module.

4. The quick charging device according to claim 2, wherein
the voltage adjusting unit includes
an additional charging unit that adjusts the potential difference to a value equal to or lower than the reference value by additionally charging one of the first battery module and the second battery module whichever having a lower voltage, and
a switching unit including a first switch that has a sixth contact that is connected to the positive electrode of the first battery module, a seventh contact that is connected to the positive electrode of the second battery module, and an eighth contact that is connected to one side of the additional charging unit, and that switches to connect the eighth contact to the sixth contact or the seventh contact, and a second switch that has a ninth contact that is connected to the negative electrode of the first battery module, a tenth contact that is connected to the negative electrode of the second battery module, and an eleventh contact that is connected to the other side of the additional charging unit, and switches to connect the eleventh contact to the ninth contact or the tenth contact.

5. The quick charging device according to claim 3, wherein if a voltage of the second battery module is lower than a voltage of the first battery module, and the second battery module includes a battery cell that is fully charged, the additional charging/discharging unit charges the first battery module and the second battery module while discharging the second battery module, if a voltage of the first battery module is lower than a voltage of the second battery module, and the first battery module includes a battery cell that is fully charged, the additional charging/discharging unit charges the first battery module and the second battery module while discharging the first battery module.

* * * * *